(12) United States Patent
Yonezawa

(10) Patent No.: US 10,770,034 B2
(45) Date of Patent: Sep. 8, 2020

(54) GENERATION SYSTEM, GENERATION METHOD, AND STORAGE MEDIUM

(71) Applicant: SAKAI DISPLAY PRODUCTS CORPORATION, Sakai-shi, Osaka (JP)

(72) Inventor: Nobuhiro Yonezawa, Sakai (JP)

(73) Assignee: SAKAI DISPLAY PRODUCTS CORPORATION, Sakai-shi, Osaka (JP)

( * ) Notice: Subject to any disclaimer, the term of this patent is extended or adjusted under 35 U.S.C. 154(b) by 0 days.

(21) Appl. No.: 16/335,642

(22) PCT Filed: Sep. 23, 2016

(86) PCT No.: PCT/JP2016/078066
§ 371 (c)(1),
(2) Date: Mar. 21, 2019

(87) PCT Pub. No.: WO2018/055743
PCT Pub. Date: Mar. 29, 2018

(65) Prior Publication Data
US 2020/0027426 A1    Jan. 23, 2020

(51) Int. Cl.
*G09G 5/36* (2006.01)
*G09G 3/00* (2006.01)
*H04N 5/66* (2006.01)

(52) U.S. Cl.
CPC ............. *G09G 5/36* (2013.01); *G09G 3/006* (2013.01); *H04N 5/66* (2013.01); *G06T 2207/20104* (2013.01); *G09G 2320/0233* (2013.01); *G09G 2320/0285* (2013.01)

(58) Field of Classification Search
None
See application file for complete search history.

(56) References Cited

U.S. PATENT DOCUMENTS

2014/0118558 A1* 5/2014 Imoto .................... G09G 3/006
348/181

FOREIGN PATENT DOCUMENTS

| JP | 2004-342067 A | 12/2004 |
| JP | 4942808 B2 | 5/2012 |
| JP | 2014-086996 A | 5/2014 |

* cited by examiner

*Primary Examiner* — Aneeta Yodichkas
(74) *Attorney, Agent, or Firm* — ScienBiziP, P.C.

(57) ABSTRACT

In a generation system, while a mark image including a prescribed mark is displayed on the display screen of a display panel, a capturing device captures a plurality of partial images in which a portion of the display screen is seen and generates capture data of each of the plurality of partial images. A correction data generation device specifies, for each of the plurality of partial images captured by the capturing device, an object area in the partial image on the basis of the mark included in the partial image. The correction data generation device extracts, for each of the plurality of partial images, an object portion that corresponds to the object area from the capture data of the partial images, and synthesizes a plurality of extracted object portions, thereby generating screen image data that corresponds to the capture data of the entire display screen.

20 Claims, 9 Drawing Sheets

Gradation values before correction indicated
by input image data

| 125 | 124 | 125 |
|-----|-----|-----|
| 124 | 123 | 124 |
| 125 | 124 | 125 |

Correction values

| −1 | 0  | −1 |
|----|----|----|
| +1 | −2 | +1 |
| −2 | 0  | −2 |

Gradation values after
correction

| 124 | 124 | 124 |
|-----|-----|-----|
| 125 | 121 | 125 |
| 123 | 124 | 123 |

FIG. 5

Display screen displaying image based on first mark image data

Display screen displaying image based on second mark image data

Display screen displaying image based on third mark image data

Partial image including imaging target B2    Specification of target region

GENERATION SYSTEM, GENERATION METHOD, AND STORAGE MEDIUM

TECHNICAL FIELD

The present invention relates to a generation system and a generation method for generating screen image data corresponding to captured image data of a whole display screen of a display panel, and a computer program for generating the screen image data.

BACKGROUND ART

An unevenness correction system for correcting brightness unevenness occurring in a display screen of a display panel is conventionally known. For example, Patent Literature 1 discloses an unevenness correction system in Which a screen image of a whole display screen of a display panel is captured with a test image displayed on the display screen, and correction data to be used for correcting brightness unevenness is generated based on the thus captured image data of the whole display screen.

CITATION LIST

Patent Literature

[Patent Literature 1]
Japanese Patent No. 4942808

SUMMARY OF INVENTION

Technical Problem

A conventional unevenness correction system as one described in Patent Literature 1 includes an imaging device, and the imaging device is disposed in such a manner that a light receiving surface thereof opposes the center of the display screen to capture a screen image.

In employing such a structure, as the display panel to be subjected to the brightness unevenness correction is larger, namely, as the display screen corresponding to an imaging target has a larger area, it is necessary to use an expensive imaging device coping with a larger imaging range. Besides, as the display screen corresponding to the imaging target has a larger area, an angle between light entering the imaging device from an end portion of the display screen and the optical axis of the imaging device is larger. When this angle is large, a difference between the intensity of light entering the imaging device from the center of the display screen and the intensity of light entering the imaging device from the end portion of the display screen is large, and hence, it is difficult to generate screen image data accurately indicating gradation values of respective portions of the display screen.

Furthermore, when the imaging range of the imaging device is large, the amount of light reflected on the display panel and entering the imaging device is large, and hence, it is more difficult to generate screen image data accurately indicating gradation values of respective portions of the display screen. In the unevenness correction system, when screen image data accurately indicating gradation values of respective portions of the display screen cannot be generated, it is difficult to generate optimal correction data with which brightness unevenness occur in the display screen can be appropriately corrected.

The present invention was devised in consideration of these circumstances, and an object is to provide a generation system, a generation method and a computer program with which screen image data accurately indicating gradation values of respective portions of a display screen can be easily generated at low cost even when the display screen has a large size.

Solution to Problem

A generation system according to the present invention includes: a display control section causing a mark image including a prescribed mark to be displayed on a display screen of a display panel; an imaging section capturing a plurality of partial images in each of which a part of the display screen is imaged with the mark image displayed on the display screen, and generating captured image data of the plurality of partial images; a specification section specifying, in each of the plurality of partial images, a target region within the partial image based on the mark included in the partial image; an extraction section extracting, in each of the plurality of partial images, a target part corresponding to the target region from the captured image data of the partial image; and a screen image data generation section generating screen image data corresponding to captured image data of the whole display screen by synthesizing the target parks extracted by the extraction section.

A generation method according to the present invention includes: causing a mark image including a prescribed mark to be displayed on a display screen of a display panel; capturing a plurality of partial images in each of which a part of the display screen is imaged with the mark image displayed on the display screen, and generating captured image data of the plurality of partial images; specifying, in each of the plurality of partial images, a target region within the partial image based on the mark included in the partial image; extracting, in each of the plurality of partial images, a target part corresponding to the target region from the captured image data of the partial image; and generating screen image data corresponding to captured image data of the whole display screen by synthesizing the target parts extracted.

A computer program according to the present invention causes a computer to execute processing of: causing a mark image including a prescribed mark to be displayed on a display screen of a display panel; capturing a plurality of partial images in each of which a part of the display screen is imaged with the mark image displayed on the display screen to generate captured image data of the plurality of partial images, and acquiring the generated captured image data of the plurality of partial images; specifying, in each of the plurality of partial images, a target region within the partial image based on the mark included in the partial image; extracting, in each of the plurality of partial images, a target part corresponding to the target region from the captured image data of the partial image; and generating screen image data corresponding to captured image data of the whole display screen by synthesizing the target parts extracted.

Advantageous Effects of Invention

According to the present invention, a generation system, a generation method and a computer program with which screen image data accurately indicating gradation values of respective portions of a display screen can be easily generated at low cost even when the display screen has a large size are provided.

BRIEF DESCRIPTION OF DRAWINGS

FIG. 5 is an explanatory diagram of correction of a gradation value.

DESCRIPTION OF EMBODIMENTS

Now, an embodiment of the present invention will be described in detail with reference to the accompanying drawings.

Figure 1:
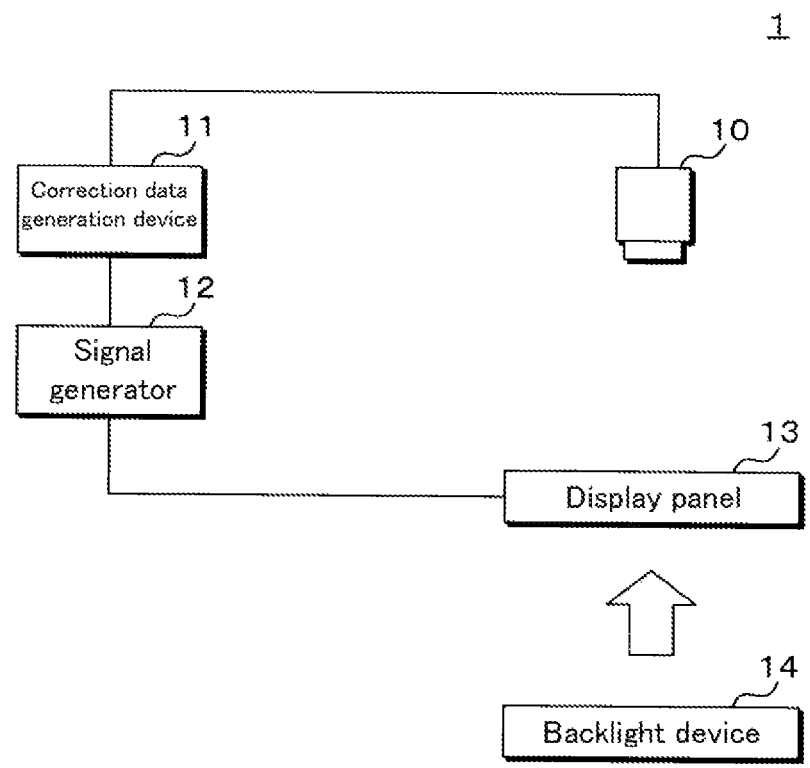
FIG. 1 is a block diagram illustrating a principal structure of a generation system according to an embodiment.

FIG. 1 is a block diagram illustrating a principal structure of a generation system 1 according to the present embodiment. The generation system 1 includes an imaging device 10, a correction data generation device 11, a signal generator 12, a display panel 13 including a display screen 21 (see FIG. 2), and a backlight device 14. In the generation system 1, the imaging device 10 and the correction data generation device 11 are communicably connected to each other, the correction data generation device 11 and the signal generator 12 are communicably connected to each other, and the signal generator 12 and the display panel 13 are communicably connected to each other. In addition, the correction data generation device 11 and the display panel 13 may be communicably connected to each other directly without through the signal generator 12.

The correction data generation device 11 outputs, to the signal generator 12, image data of a test image to be displayed on the display screen 21 in capturing the display screen 21 (hereinafter referred to as the test image data). In the present embodiment, the test image is a mark image including a prescribed mark, and specifically an image in which at least one mark having precedently determined shape and color is disposed in an image having a prescribed gradation value (such as a gray solid image). The test image data indicates gradation values of a plurality of pixels constituting the mark image. The test image data will be described in detail later. When the test image data is input from the correction data generation device 11, the signal generator 12 outputs an image signal including the input test image data to the display panel 13.

The backlight device 14 irradiates the display panel 13 with light. The display panel 13 displays an image on the display screen 21 with the light irradiated by the backlight device 14. To the display panel 13, an image signal including image data of an image to be displayed on the display screen 21 (a display target image) is input from the signal generator 12 or another device. In a storage section 33 of the display panel 13, correction data D to be used for correcting brightness unevenness occurring in the display screen 21 is stored (see FIG. 3). When an image signal is input from the signal generator 12 or another device, the display panel 13 corrects, with the correction data D stored in the storage section 33, respective gradation values indicated by image data included in the input image signal (hereinafter referred to as the input image data). The display panel 13 displays, using the thus corrected gradation values, an image based on the input image data, namely, a display target image, on the display screen 21. Since the display target image is displayed using the gradation values having been corrected based on the correction data D, brightness unevenness otherwise occurring in the display screen 21 in displaying the display target image is eliminated or reduced.

The correction data generation device 11 outputs, to the imaging device 10, a capturing signal for instructing to capture a part of the display screen 21. When the capturing signal is input from the correction data generation device 11, the imaging device 10 captures a partial image in which a part of the display screen 21 is imaged, and generates partial image data corresponding to captured image data of this partial image. The partial image data indicates gradation values of a plurality of pixels constituting the partial image. The capturing signal also includes information on which part of the display screen 21 is to be captured, namely, information on an imaging target corresponding to a partial region of the display screen 21 to be captured. The imaging device 10 captures the partial image with the imaging target indicated by the capturing signal used as an imaging range. The imaging device 10 outputs the generated partial image data to the correction data generation device 11. The imaging device 10 functions as an imaging section.

The correction data generation device 11 generates screen image data using a plurality of partial image data input from the imaging device 10. The screen image data is image data corresponding to captured image data of the whole display screen 21, and indicates gradation values of respective parts of the display screen 21. The correction data generation device 11 generates, using the generated screen image data, the correction data D to be used for correcting the brightness unevenness occurring in the display screen 21. As described above, the correction data D is used for the correction of a plurality of gradation values indicated by the input image data. The correction data generation device 11 outputs the generated correction data D to the signal generator 12. When the correction data D is input from the correction data generation device 11, the signal generator 12 outputs, to the display panel 13, a correction signal including the input correction data D. When the correction signal is input from the signal generator 12, the display panel 13 rewrites the correction data D stored in the storage section 33 to the correction data D included in the input correction signal. Incidentally, the correction data generation device 11 may output the generated correction data D not through the signal generator 12 but directly to the display panel 13.

Figure 2:
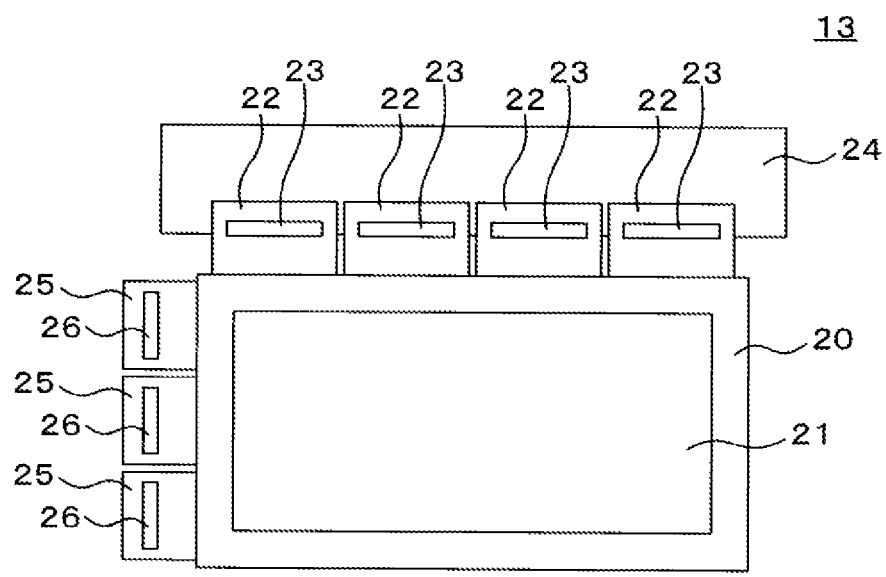
FIG. 2 is a front view of a display panel.

FIG. 2 is a front view of the display panel 13. The display panel 13 has a rectangular display member 20. The display member 20 includes two glass substrates of a first substrate and a second substrate. The first substrate and the second substrate are bonded to each other with their plate surfaces opposing each other with a circular sealing material not shown disposed therebetween. Liquid crystal is sealed within an inside portion of the sealing material (portion surrounded by the sealing material). The display screen 21 for displaying a display target image is provided on the plate surface of the first substrate out of these two glass substrates of the display member 20. The imaging device 10 is disposed in such a manner that a light receiving surface thereof opposes the display screen 21 of the display panel 13.

On one long side of the display member 20, a plurality of printed boards 22 are attached. On each of the plural printed boards 22, a source driver 23 is mounted. The plural printed boards 22 are attached to one signal board 24. Besides, on one short side of the display member 20, a plurality of printed boards 25 are attached. On each of the plural printed boards 25, a gate driver 26 is mounted.

Although FIG. 2 illustrates the display panel 13 including four printed boards 22 and four source drivers 23, and three printed boards 25 and three gate drivers 26, the numbers of the printed boards 22 and the source drivers 23 are not limited to four, and the numbers of the printed boards 25 and the gate drivers 26 are not limited to three.

Figure 3:
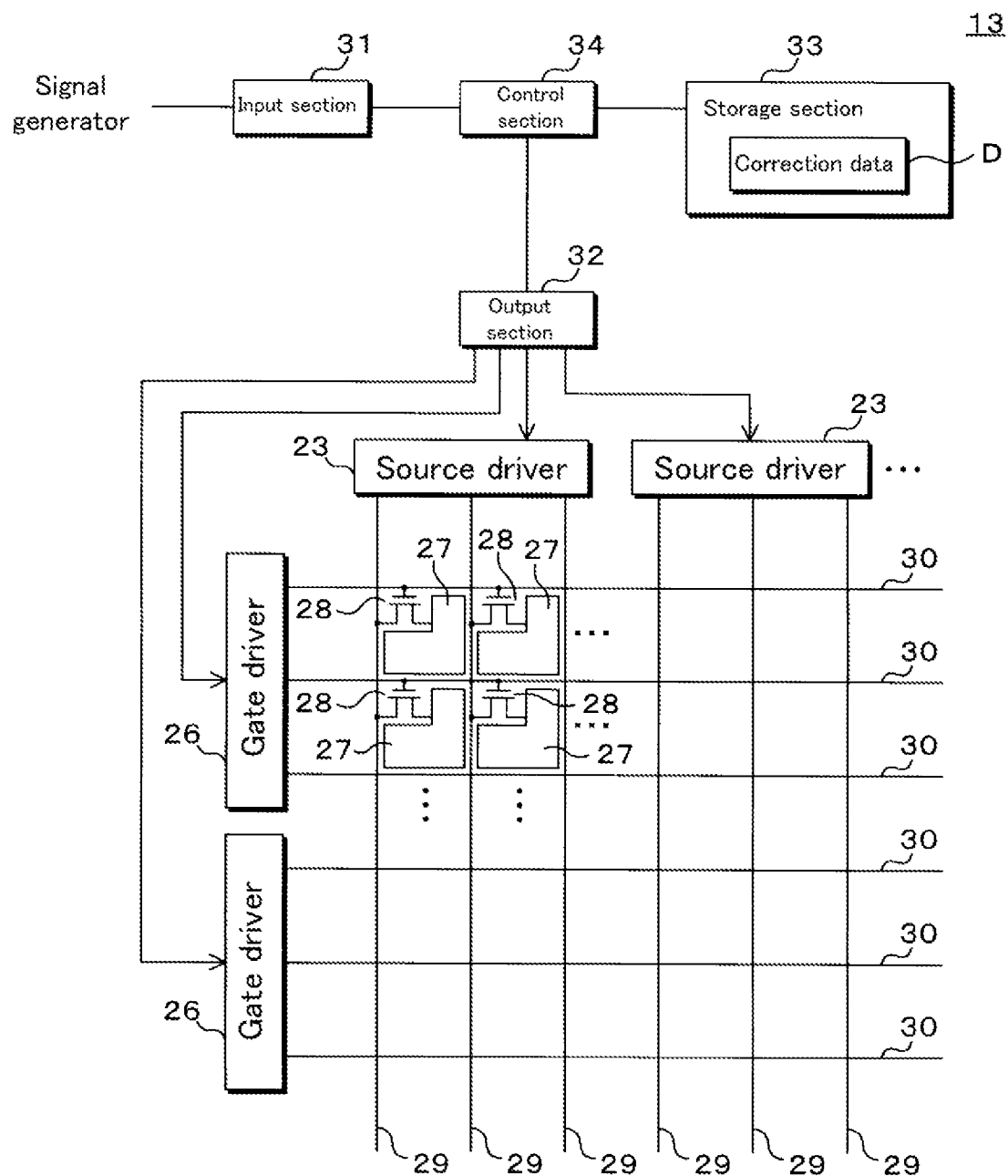
FIG. 3 is a block diagram illustrating a principal structure of the display panel.

FIG. 3 is a block diagram illustrating a principal structure of the display panel 13. On the second substrate out of the two glass substrates of the display member 20, a plurality of pixel electrodes 27 are arranged in a grid pattern as illustrated in FIG. 3. Each of the plural pixel electrodes 27 is connected to the drain of a TFT (Thin Film Transistor) 28. Since the plural pixel electrodes 27 are arranged in a grid pattern, the plural TFTs 28 are also arranged in a grid pattern. The plural pixel electrodes 27 are disposed inside the sealing member on the second substrate. The plural pixel electrodes 27 are transparent and have a plate shape.

The plural source drivers 23 are respectively connected to a plurality of source lines 29. The plural gate drivers 26 are respectively connected a plurality of gate lines 30.

Although three source lines 29 are connected to one source driver 23 and three gate lines 30 are connected to one gate driver 26 in the exemplified case of FIG. 3, the number of source lines 29 connected to one source driver 23 and the number of gate lines 30 connected to one gate driver 26 are not limited to three.

The plural source lines 29 are each connected to sources of plural TFTs 28 arranged in one column. The plural gate lines 30 are each connected to gates of plural TFTs 28 arranged in one row.

Each TFT 28 functions as a switch. When a voltage of the gate line 30 connected to the gate of one TFT 28 is equal to or higher than a specific voltage, the TFT 28 is in an on state. When the TFT 28 is in an on state, a voltage can be applied from the source line 29 connected to the source of this TFT 28 to the pixel electrode 27 connected to the drain of this TFT 28. When a voltage of the gate line 30 connected to the gate of one TFT 28 is lower than the specific voltage, the TFT 28 is in an off state. When the TFT 28 is in an off state, no voltage is applied to the pixel electrode 27 connected to the drain of this TFT 28.

On the first substrate of the display member 20, a common electrode in a rectangular plate shape not shown is disposed inside the sealing material. The common electrode is also transparent. A plate surface of the common electrode opposes plate surfaces of the plural pixel electrodes 27. To each of the plural pixel electrodes 27, a voltage based on the potential of the common electrode is applied via one of the plural source lines 29 by one of the plural source drivers 23. The liquid crystal consists of a large number of liquid crystal molecules. When a voltage is applied to one pixel electrode 27, a voltage is applied to liquid crystal molecules disposed in a position corresponding to this pixel electrode 27 (a position sandwiched between this pixel electrode 27 and the common electrode). A state of the liquid crystal molecules varies depending on the magnitude of the voltage applied to the liquid crystal molecules.

The light irradiated by the backlight device 14 is transmitted through the plural pixel electrodes 27, the common electrode, the display screen 21 and a polarizing plate not shown. The intensity of the light transmitted through one pixel electrode 27 changes in accordance with the state of liquid crystal molecules disposed in the position corresponding to the one pixel electrode 27, namely, the magnitude of the voltage applied to the liquid crystal molecules.

To the plural source drivers 23 and the plural gate drivers 26, control signals for causing an image based on input image data, namely, a display target image, to be displayed on the display screen 21 are respectively input. The plural source drivers 23 apply, in accordance with the input control signals, voltages respectively to the plural source lines 29. The plural gate drivers 26 apply, in accordance with the input control signals, voltages respectively to the plural gate lines 30. Thus, a voltage is individually applied to each f the plural pixel electrodes 27 via one of the plural source lines 29. The intensity of the light transmitted through each pixel electrode 27 is adjusted in accordance with the control signals.

One pixel includes three pixel electrodes 27 respectively corresponding to red, green and blue colors. Light output from a pixel electrode 27 corresponding to the red color is transmitted through a red filter. Red light alone is transmitted through the red filter. Similarly, light output from a pixel electrode 27 corresponding to the green color is transmitted through a green filter. Green light alone is transmitted through the green filter. Light output from a pixel electrode 27 corresponding to the blue color is transmitted through a blue filter. Blue light alone is transmitted through the blue filter. These three pixel electrodes 27 respectively corresponding to the red, green and blue colors are arranged in a row direction or a column direction. The display panel 13 includes a plurality of pixels. For each of the plural pixels, a gradation value corresponding to color and brightness is set. In each of the plural pixels, a voltage in accordance with the gradation value thereof is applied respectively to the three pixel electrodes 27 thereof. The gradation value is expressed by, for example, digital information of 8 bits. In this case, the gradation value is expressed by an integer value ranging from zero to 255.

The display panel 13 further includes an input section 31, an output section 32, the storage section 33 and a control section 34. The input section 31, the output section 32 and the storage section 33 are respectively connected to the control section 34. The input section 31 is further connected to the signal generator 12. The output section 32 is further connected to the plural source drivers 23 and the plural gate drivers 26.

To the input section 31, an image signal and a correction signal are input from the signal generator 12. When the image signal is input from the signal generator 12, the input section 31 outputs the input image signal to the control section 34. When the correction signal is input from the signal generator 12, the input section 31 outputs the input correction signal to the control section 34.

The output section 32 outputs the control signals to the plural source drivers 23 and the plural gate drivers 26 in accordance with an instruction from the control section 34.

The storage section 33 is, for example, a nonvolatile memory. The storage section 33 stores the correction data D.

The control section 34 is, for example, a timing controller (T-CON), and includes a logic circuit such as an FPGA (Field Programmable Gate Array) or an ASIC (Application Specific Integrated Circuit). The control section 34 performs image display processing for displaying an image based on input image data (a display target image) on the display screen 21, and rewrite processing for rewriting the correction data D stored in the storage section 33.

Figure 4:
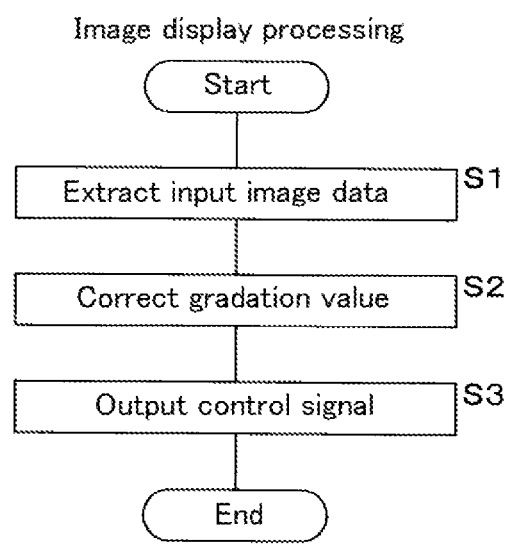
FIG. 4 is a flowchart illustrating procedures in image display processing.

FIG. 4 is a flowchart illustrating procedures in the image display processing. The control section 34 executes the image display processing every time an image signal is input thereto. The input image data included in the image signal input from the signal generator 12 is test image data, and in the present embodiment, is first mark image data, second mark image data or third mark image data described later. Besides, an image signal input from a device different from the signal generator 12 is, for example, an image signal for TV broadcasting.

In the image display processing, the control section 34 extracts the input data from the input image signal (step S1), and corrects a plurality of gradation values indicated by the extracted input image data with the correction data D stored in the storage section 33 (step S2).

FIG. 5 is an explanatory diagram of correction of a gradation value. In description of the correction of a gradation value, it is assumed, for simplification, that input image data includes nine pixels, and that the nine pixels are arranged in a 3×3 matrix. It is also assumed that a gradation value is expressed by an integer value ranging from zero to 255. FIG. 5 illustrates nine gradation values indicated by the input image data, nine correction values indicated by the correction data D, and nine corrected gradation values.

In step S2 of the image display processing, the control section 34 adds, for each of the pixels, the correction value to the gradation value before the correction indicated by the input image data. Thus, the nine gradation values indicated by the input image data are corrected.

For example, for a pixel disposed in the upper left position, a correction value of (−1) is added to 125, that is, the gradation value before the correction. Thus, the gradation value of the pixel disposed in the upper left position is corrected to 124.

After executing step S2, the control section 34 outputs control signals based on the corrected gradation values obtained in step S2 to the plural source drivers 23 and the plural gate drivers 26 (step S3). Thus, the display target image is displayed based on the corrected gradation values on the display screen 21 of the display panel 13.

After executing step S3, the control section 34 completes the image display processing.

There is a possibility that the plural pixels included in the display panel 13 may include one or more pixels in each of which a gradation value indicated by the image data included in the image signal is different from an actual gradation value corresponding to color and brightness of light actually output based on the image data. Even when such a pixel is included, the actual gradation value and the gradation value indicated by the image data included in the image signal can be made consistent with each other by correcting the gradation value.

Figure 6:
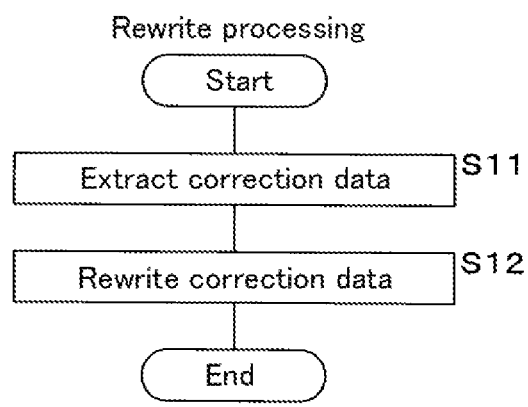
FIG. 6 is a flowchart illustrating procedures in rewrite processing.

FIG. 6 is a flowchart illustrating procedures in the rewrite processing. The control section 34 executes the rewrite processing every time the correction signal is input thereto. In the rewrite processing, the control section 34 extracts correction data D from the input correction signal (step S11), and rewrites the correction data D stored in the storage section 33 to the extracted correction data D (step S12). After executing step S12, the control section 34 completes the rewrite processing.

Figure 7:
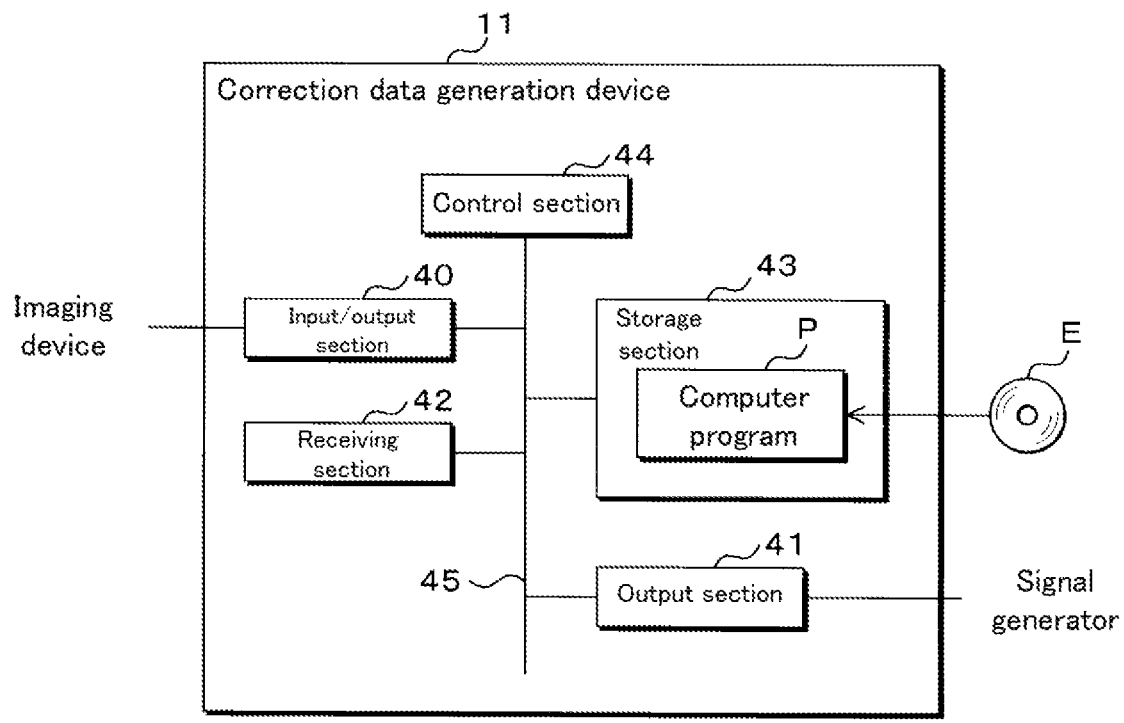
FIG. 7 is a block diagram illustrating a principal structure of a correction data generation device.

FIG. 7 is a block diagram illustrating a principal structure of the correction data generation device 11. The correction data generation device 11 includes an input/output section 40, an output section 41, a receiving section 42, a storage section 43 and a control section 44. These sections are respectively connected to a bus 45. The input/output section 40 is connected also to the imaging device 10 in addition to the bus 45. The output section 41 is connected also to the signal generator 12 in addition to the bus 45.

The input/output section 40 outputs, in accordance with an instruction from the control section 44, a capturing signal indicating an imaging target to the imaging device 10. To the input/output section 40, the partial image data is input from the imaging device 10. When the partial image data is input from the imaging device 10, the input/output section 40 imparts the input partial image data to the control section 44.

The output section 41 outputs, in accordance with an instruction from the control section 44, the image data and the correction data D to the signal generator 12.

The receiving section 42 receives, from an operator of the correction data generation device 11, a generation instruction for instructing generation of the correction data D.

The storage section 43 is, for example, a nonvolatile memory. The storage section 43 stores a computer program P.

The control section 44 includes a CPU (Central Processing Unit) not shown. The CPU of the control section 44 executes, through execution of the computer program P stored in the storage section 43, screen image data generation processing for generating screen image data and correction data generation processing for generating the correction data D. In other words, the computer program P is a program for causing a computer to execute the screen image data generation processing and the correction data generation processing. When the receiving section 42 receives the generation instruction, the control section 44 executes the screen image data generation processing and correction data generation processing in order.

It is noted that the computer program P may be stored in a storage medium E readably by a computer. In this case, the computer program P read from the storage medium E by a reading device not shown is stored in the storage section 43. The storage medium E is an optical disk, a flexible disk, a magnetic disk, a magneto-optical disk, a semiconductor memory or the like. The optical disk is a CD (Compact Disc)-ROM (Read Only Memory), a DVD (Digital Versatile Disc)-ROM, a BD (Blue-Ray (Japanese registered trademark) Disc) or the like. The magnetic disk is, for example, a hard disk. Alternatively, the computer program P may be downloaded from an external device not shown connected to a communication network not shown so that the downloaded computer program P may be stored in the storage section 43.

Figure 8:
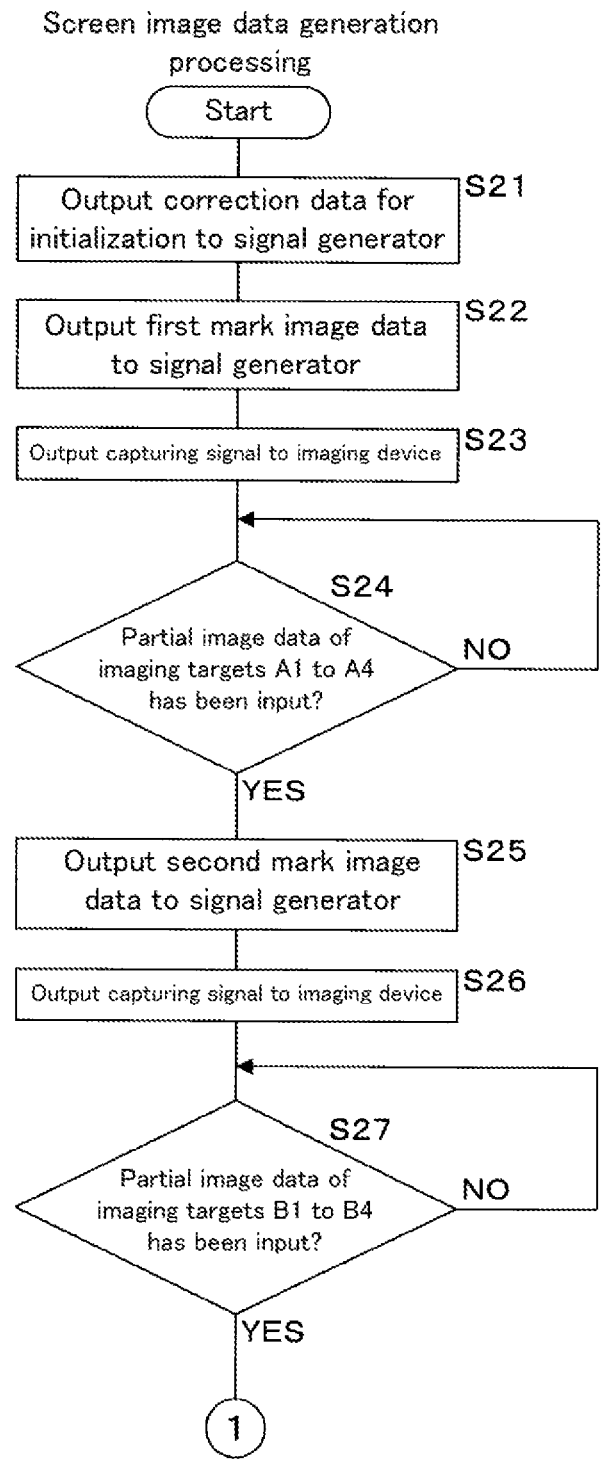
FIG. 8 is a flowchart illustrating procedures in screen image data generation processing.
Figure 9:
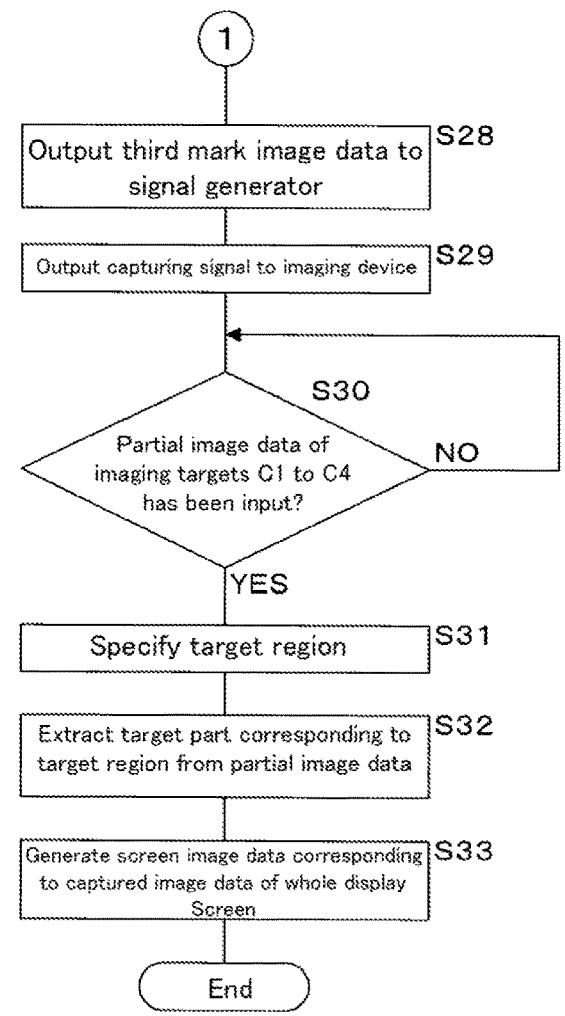
FIG. 9 is a flowchart illustrating procedures n the screen image data generation processing.

FIG. 8 and FIG. 9 are flowcharts illustrating procedures in the screen image data generation processing. First, the control section 44 instructs the output section 41 to output correction data D for initialization to the signal generator 12 (step S21). The correction data D for initialization is correction data to be used for initializing the correction data D stored in the storage section 33 of the display panel 13. In the correction data D for initialization, correction values corresponding to all the pixels are zero. When the control section 44 executes step S21, the signal generator 12 outputs, to the input section 31 of the display panel 13, a correction signal including the correction data D for initialization. The control section 34 of the display panel 13 having received the correction signal executes the rewrite processing, and thus, the correction values corresponding to all the pixels in the correction data D stored in the storage section 33 are set to zero.

Next, the control section 44 instructs the output section 41 to output the first mark image data to the signal generator 12 (step S22). Thus, the signal generator 12 outputs, to the input section 31 of the display panel 13, an image signal including the first mark image data, and the control section 34 executes the image display processing. In the image display processing, the control section 34 causes an image based on the first mark image data to be displayed on the display screen 21 of the display panel 13. The control section 44 of the correction data generation device 11 functions as a display control section for causing a mark image to be displayed on the display screen 12 of the display panel 13.

Figure 10:
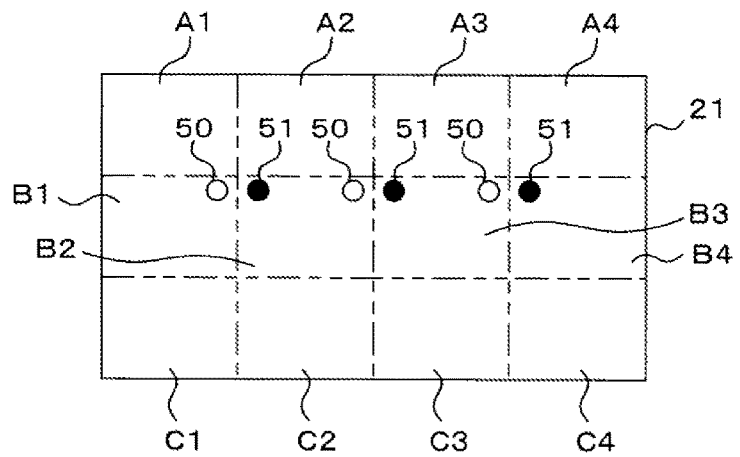
FIG. 10 is a schematic diagram of a display screen on which an image based on first mark image data is displayed.

FIG. 10 is a schematic diagram of the display screen 21 on which the image based on the first mark image data is displayed. A solid line corresponds to the edge of the display screen 21. Each two-dot chain line is an imaginary line and actually not displayed on the display screen 21. In the display screen 21, rectangular imaging targets A1 to A4, B1 to B4 and C1 to C4 to be captured by the imaging device 10 are set in a grid pattern as illustrated in FIG. 10. The four imaging targets A1 to A4 are arranged in the first row, the four imaging targets B1 to B4 are arranged in the second row, and the four imaging targets C1 to C4 are arranged in the third row.

The image based on the first mark image data is a mark image including a prescribed mark, and specifically an image in which at least one mark having precedently determined shape, color and the like is disposed in an image having a prescribed value of the gradation value (such as a gray solid image). When the gradation value is expressed by an integer value ranging from 0 to 255, the prescribed value is, for example, 128. The image based on the first mark image data may include a plurality of types of marks. In an example illustrated in FIG. 10, the image based on the first mark image data include three white circles 50 and three black circles 51. Here, the white circle 50 is a first type of mark, and the black circle 51 is a second type of mark. In the present embodiment, the first type of mark indicates that a boundary of an imaging target is present on the right hand side thereof, and the second type of mark indicates that a boundary of an imaging target is present on the left hand side thereof.

In the image based on the first mark image data, two marks (one white circle 50 and one black circle 51) disposed adjacent to each other in a lateral direction of the display screen 21 (a direction along the long side of the display screen 21) together form one pair (hereinafter, which pair will be referred to as a mark set). In the display screen 21 displaying the image based on the first mark image data, three mark sets (the three white circles 50 and the three black circles 51) are disposed outside the imaging targets A1 to A4 and in the vicinity of corners of the imaging targets A1 to A4. In the display screen 21 displaying the image based on the first mark image data, the mark sets respectively indicate positions of the boundaries between the imaging targets A1 to A4. Specifically, the white circle 50 and the black circle 51 belonging to each mark set indicate that an intermediate position therebetween corresponds to the position of any boundary between the imaging targets A1 to A4.

After executing step S22, the control section 44 instructs the input/output section 40 to output a capturing signal indicating the imaging targets A1 to A4 to the imaging device 10 (step S23). Thus, with the image based on the first mark image data displayed on the display screen 21, the imaging device 10 captures four partial images respectively including the imaging targets A1 to A4 in an order of, for example, the imaging targets A1 to A4. It is noted that the order of capturing the imaging targets A1 to A4 can be arbitrarily determined. In each of the four partial images, a part of the display screen 21 on which the image based on the first mark image data is displayed is imaged. The imaging device 10 is disposed in such a manner that the light receiving surface thereof can oppose the center of each of the imaging targets A1 to A4.

The imaging device 10 generates four partial image data respectively corresponding to captured image data of the four partial images thus captured, and outputs the generated four partial image data to the input/output section 40 of the correction data generation device 11. The control section 44 acquires, from the input/output section 40, the four partial image data generated by the imaging device 10. The control section 44 instructs to capture the partial images including the imaging targets A1 to A4 by executing step S23.

Each of the partial images including the imaging targets A1 to A4 includes, in addition to a data extraction target region corresponding to the imaging target, the mark set (the white circle 50 and the black circle 51) displayed around the imaging target. For example, a partial image including the imaging target A1 includes, in addition to a target region corresponding to the imaging target A1, the mark set disposed first from the left. A partial image including the imaging target A2 includes, in addition to a target region corresponding to the imaging target A2, the mark set disposed first from the left and the mark set disposed second from the left.

After executing step S23, the control section 44 determines whether or not the respective partial image data of the imaging targets A1 to A4 has been input from the imaging device 10 to the input/output section 40 (step S24). When it is determined that the partial image data of the imaging targets A1 to A4 has not been input (S24: NO), the control section 44 waits until all the four partial image data is input to the input/output section 40.

When it is determined that the partial image data of the imaging targets A1 to A4 has been input (S24: YES), the control section 44 instructs the output section 41 to output the second mark image data to the signal generator 12 (step S25). Thus, the signal generator 12 outputs, to the input section 31 of the display panel 13, an image signal including the second mark image data, and the control section 34 causes an image based on the second mark image data to be displayed on the display screen 21 of the display panel 13.

Figure 11:
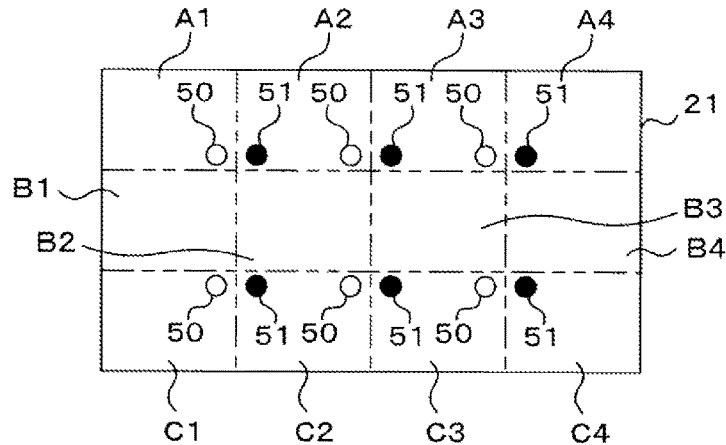
FIG. 11 is a schematic diagram of a display screen on which an image based on second mark image data is displayed.

FIG. 11 is a schematic diagram of the display screen 21 on which the image based on the second mark image data is displayed. A solid line corresponds to the edge of the display screen 21. Each two-dot chain line is an imaginary line and actually not displayed on the display screen 21.

Similarly to the image based on the first mark image data, the image based on the second mark image data is a mark image including a prescribed mark, and specifically an image in which at least one mark having precedently determined shape, color and the like is disposed in an image having a prescribed value of the gradation value. Also the image based on the second mark image data may include a plurality of types of marks. In an example illustrated in FIG. 11, the image based on the second mark image data includes six mark sets (six white circles 50 and six black circles 51). In the display screen 21 displaying the image based on the second mark image data, six mark sets are disposed outside the imaging targets B1 to B4 and in the vicinity of corners of the imaging targets B1 to B4. In the display screen 21 displaying the image based on the second mark image data, the mark sets respectively indicate positions of boundaries between the imaging targets B1 to B4. Specifically, the white circle 50 and the black circle 51 belonging to each mark set indicate that an intermediate position therebetween corresponds to the position of any boundary between the imaging targets B1 to B4.

In the image based on the second mark image data, the six mark sets are disposed in positions different from the positions of the three mark sets in the image based on the first mark image data.

In this manner, the control section 44 of the correction data generation device 11 changes the positions of the mark sets after the imaging device 10 has captured the partial images including the imaging targets A1 to A4.

After executing step S25, the control section 44 instructs the input/output section 40 to output, to the imaging device 10, a capturing signal indicating the imaging targets B1 to B4 (step S26). Thus, with the image based on the second mark image data displayed on the display screen 21, the imaging device 10 captures four partial images respectively including the imaging targets B1 to B4 in an order of, for example, the imaging targets B1 to B4. It is noted that the order of capturing the imaging targets B1 to B4 can be arbitrarily determined. In each of the four partial images, a part of the display screen 21 on which the image based on the second mark image data is displayed is imaged. The imaging device 10 is disposed in such a manner that the light receiving surface thereof opposes the center of each of the imaging targets B1 to B4.

The imaging device 10 generates four partial image data respectively corresponding to captured image data of the four partial images thus captured, and outputs the generated four partial image data to the input/output section 40 of the correction data generation device 11. The control section 44 acquires, from the input/output section 40, the four partial image data generated by the imaging device 10. The control section 44 instructs to capture the partial images including the imaging targets B1 to B4 by executing step S26. Each of the partial images including the imaging targets B1 to B4 includes, in addition to a data extraction target region corresponding to the imaging target, a mark set positioned around the imaging target.

After executing step S26, the control section 44 determines whether or not the respective partial image data of the imaging targets B1 to B4 has been input from the imaging device 10 to the input/output section 40 (step S27). When it is determined that the partial image data of the imaging targets B1 to B4 has not been input (S27: NO), the control section 44 waits until all the four partial image data is input to the input/output section 40.

When it is determined that the partial image data of the imaging targets B1 to B4 has been input (S27: YES), the control section 44 instructs the output section 41 to output the third mark image data to the signal generator 12 (step S28). Thus, the signal generator 12 outputs, to the input section 31 of the display panel 13, an image signal including the third mark image data, and the control section 34 causes an image based on the third mark image data to be displayed on the display screen 21 of the display panel 13.

Figure 12:
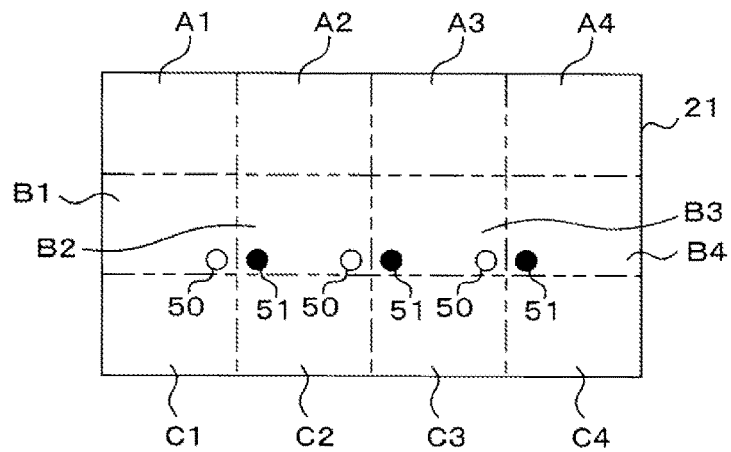
FIG. 12 is a schematic diagram of a display screen on which an image based on third mark image data is displayed.

FIG. 12 is a schematic diagram of the display screen 21 on which the image based on the third mark image data is displayed. A solid line corresponds to the edge of the display screen 21. Each two-dot chain line is an imaginary line and actually not displayed on the display screen 21.

Similarly to the images based on the first mark image data and the second mark image data, the image based on the third mark image data is a mark image including a prescribed mark, and specifically an image in which at least one mark having precedently determined shape, color and the like is disposed in an image having a prescribed value of the gradation value. Also the image based on the third mark image data may include a plurality of types of marks. In an example illustrated in FIG. 12, the image based on the third mark image data includes three mark sets (three white circles 50 and three black circles 51). In the display screen 21 displaying the image based on the third mark image data, the three mark sets are disposed outside the imaging targets C1 to C4 and in the vicinity of corners of the imaging targets C1 to C4. In the display screen 21 displaying the image based on the third mark image data, the mark sets respectively indicate positions of boundaries between the imaging targets C1 to C4. Specifically, the white circle 50 and the black circle 51 belonging to each mark set indicate that an intermediate position therebetween corresponds to the position of any boundary between the imaging targets C1 to C4.

In the image based on the third mark image data, the three mark sets are disposed in positions different, from the positions of the six mark sets in the image based on the second mark image data.

In this manner, the control section 44 of the correction data generation device 11 changes the positions of the mark sets after the imaging device 10 has captured the partial images including the imaging targets B1 to B4.

After executing step S28, the control section 44 instructs the input/output section 40 to output, to the imaging device 10, a capturing signal indicating the imaging targets C1 to C4 (step S29). Thus, with the image based on the third mark image data displayed on the display screen 21, the imaging device 10 captures four partial images respectively including the imaging targets C1 to C4 in an order of, for example, the imaging targets C1 to C4. It is noted that the order of capturing the imaging targets C1 to C4 can be arbitrarily determined. In each of the four partial images, a part of the display screen 21 on which the image based on the third mark image data is displayed is imaged. The imaging device 10 is disposed in such a manner that the light receiving surface thereof opposes the center of each of the imaging targets C1 to C4.

The imaging device 10 generates four partial image data respectively corresponding to captured image data of the four partial images thus captured, and outputs the generated four partial image data to the input/output section 40 of the correction data generation device 11. The control section 44 acquires, from the input/output section 40, the four partial image data generated by the imaging device 10, The control section 44 instructs to capture the partial images including the imaging targets C1 to C4 by executing step S29. Each of the partial images including the imaging targets C1 to C4 includes, in addition to a data extraction target region corresponding to the imaging target, a mark set positioned around the imaging target.

After executing step S29, the control section 44 determines whether or not the respective partial image data of the imaging targets C1 to C4 has been input from the imaging device 10 to the input/output section 40 (step S30). When it is determined that the partial image data of the imaging targets C1 to C4 has not been input (S30: NO), the control section 44 waits until all the four partial image data is input to the input/output section 40.

When it is determined that the partial image data of the imaging targets C1 to C4 has been input (S30: YES), the control section 44 specifies, based on the mark sets included in each partial image, the data extraction target region in each of the partial images based on the twelve partial image data input to the input/output section 40, namely, in each of the partial images including the imaging targets A1 to A4, B1 to B4 and C1 to C4 captured by the imaging device 10 (step S31). The control section 44 also functions as a specification section.

Figure 13:
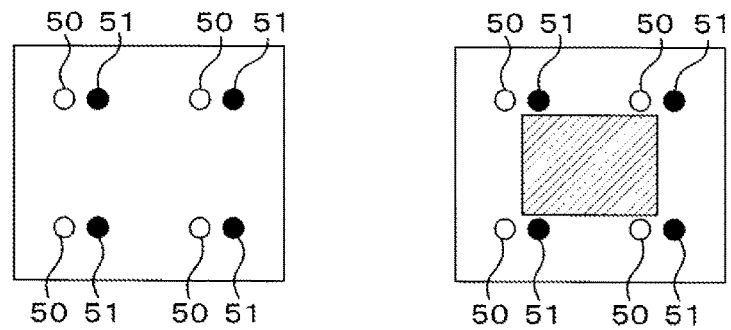
FIG. 13 is an explanatory diagram of specification of a target part.

FIG. 13 is an explanatory diagram for specification of a target region. Referring to FIG. 13, a method for specifying a target region corresponding to the imaging target B2 will be described. In a left portion of FIG. 13, a partial image including the imaging target B2 is illustrated. In a right portion of FIG. 13, a target region to be specified in the partial image including the imaging target B2 is hatched.

In the partial image including the imaging target B2, the control section 44 specifies, as a range of the target region in a longitudinal direction (a direction along the short side of the display screen 21), a part from a lower side of the mark (the white circle 50 or the black circle 51) disposed above to an upper side of the mark (the white circle 50 or the black circle 51) disposed below.

Besides, the control section 44 specifies, as a range of the target region for the lateral direction, a part from a longitudinal line passing through the center of the mark set (the pair of the white circle 50 and the black circle 51) disposed on the left side to a longitudinal line passing through the center of the mark set disposed on the right side. Then, the control section 44 specifies, as the target region, a region defined by the range in the longitudinal direction and the range in the lateral direction thus specified.

In this manner, the control section 44 specifies the data extraction target region based on the four mark sets imaged in the partial image including the imaging target B2.

An image displayed in the display screen 21, namely, an image based on each of the first mark image data, the second mark image data and the third mark image data includes an imaging target having the edge of the display screen 21 imaged in the corresponding partial image. Some marks disposed in the vicinity of a corner of such an imaging target are not displayed.

Figure 14:
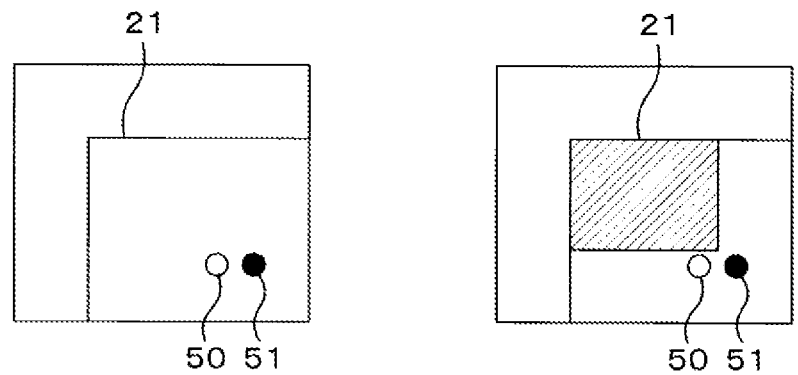
FIG. 14 is another explanatory diagram of the specification of a target part.

FIG. 14 is another explanatory diagram for the specification of a target region, Referring to FIG. 14, a method for specifying a target region corresponding to the imaging target A1 will be described. In a left portion of FIG. 14, a partial image including the imaging target A1 is illustrated. In a right portion of FIG. 14, a target region to be specified in the partial image including the imaging target A1 is hatched.

As illustrated in FIG. 14, the left and upper edges of the display screen 21 are imaged in the partial image including the imaging target A1. Therefore, in the image based on the first mark image data, a mark set (a pair of the white circle 50 and the black circle 51) is imaged merely in the vicinity of the lower right corner of the imaging target A1 as illustrated in FIG. 10.

The control section 44 recognizes the edge of the display screen 21 imaged in the partial image as a boundary of the target region. In the specification of the target region of the imaging target A1, the control section 44 specifies, as a range of the target region in the longitudinal direction, a part from the upper edge of the display screen 21 to an upper side of the white circle 50 or the black circle 51. Besides, the control section 44 specifies, as a range of the target region in the lateral direction, a part from the left edge of the display screen 21 to a longitudinal line passing through the center between the white circle 50 and the black circle 51. Then, the control section 44 specifies, as the target region, a region defined by the range in the longitudinal direction and the range in the lateral direction thus specified.

In step S31, the control section 44 specifies the target regions of the imaging targets A1 to A4, B1 to B4 and C1 to C4 in this manner.

Next, the control section 44 extracts target parts respectively corresponding to the target regions specified in step S31 from the twelve partial image data input to the input/output section 40, namely, the twelve partial image data generated by the imaging device 10 (step S32). Then, the control section 44 generates screen image data corresponding to captured image data of the whole display screen 21 by synthesizing the twelve target parts extracted in step S32 (step S33). The control section 44 of the correction data generation device 11 also functions as an extraction section and a screen image data generation section.

After executing step S33, the control section 44 completes the screen image data generation processing. Thereafter, the control section 44 executes the correction data generation processing.

Figure 15:
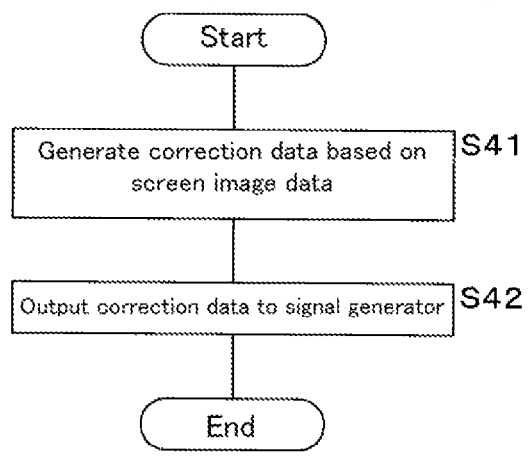
FIG. 15 is a flowchart illustrating procedures in correction data generation processing.

FIG. 15 is a flowchart illustrating procedures in the correction data generation processing. In the correction data generation processing, the control section 44 first generates correction data based on the screen image data generated through the screen image data generation processing executed immediately before (step S41). The control section 44 also functions as a correction data generation section. Next, the control section 44 outputs, to the signal generator 12, the correction data D generated in step S41 (step S42). Thus, the signal generator 12 outputs, to the input section 31 of the display panel 13, a correction signal including the correction data D generated in the correction data generation processing. Then, the control section 34 of the display panel 13 executes the rewrite processing, so that the correction data D stored in the storage section 33 is rewritten by the correction data D generated through the correction data generation processing.

After executing step S42, the control section 44 completes the correction data generation processing.

In the generation system 1 thus configured, the imaging device 10 only needs to capture twelve partial images in each of which a part of the display screen 21 is imaged, and hence, the imaging device 10 can be constructed by an inexpensive camera having a narrow imaging range. Therefore, the generation system 1 can be inexpensively constructed.

Besides, as is obvious, each of the imaging targets A1 to A4, B1 to B4 and C1 to C4 is smaller than the whole display screen 21. Therefore, in each of the imaging targets A1 to A4, B1 to B4 and C1 to C4, there is a small difference in the intensity between light entering the light receiving surface of the imaging device 10 from the center and from the edge thereof. Furthermore, in using the imaging device 10 having a narrow imaging range, the amount of light reflected on the display panel 13 and entering the light receiving surface of the imaging device 10 is small. As a result, the control section 44 of the correction data generation device 11 can generate screen image data accurately indicating gradation values of respective portions of the display screen 21 even when the display screen 21 is large.

Besides, the control section 44 of the correction data generation device 11 can easily specify a data extraction target region based on the marks (the white circles 50 and the black circles 51) included in each partial image. Therefore, the control section 44 can easily generate the screen image data at low cost.

Furthermore, the image including the marks disposed outside the target regions corresponding to the imaging targets A1 to A4, B1 to B4 and C1 to C4 and in the vicinity of the corners of the target regions is displayed on the display screen 21, a data extraction target region can be easily specified in each partial image.

Besides, every time the imaging device 10 captures one or a plurality of (four, in the present embodiment) partial images, the positions of marks included in an image displayed on the display screen 21 are changed. In this manner, every time a partial image is captured, the control section 44 can display, on the display screen 21, a mark image including marks disposed in appropriate positions for indicating boundaries of the imaging targets.

In addition, the control section 34 of the display panel 13 displays mark sets disposed adjacently on the display screen 21, and therefore, the control section 44 of the correction data generation device 11 can easily recognize the boundaries in the lateral direction of a data extraction target region. Therefore, the control section 44 can easily extract the data extraction target region.

Incidentally, timing for changing the positions of marks by the control section 34 of the display panel 13 in the screen image data generation processing is not limited to every time the imaging device 10 captures four partial images, but may be every time one, two, three, five or more partial images are captured. When the control section 34 changes the positions of the marks after the imaging device 10 has captured N (N: natural number) partial images, marks to be included in each of the N partial images are simultaneously displayed on the display screen 21.

For example, when the control section 34 changes the positions of the marks after the imaging device 10 has captured one partial image, the control section 34 first causes a mark corresponding to a region of the imaging target A1 to be displayed on the display screen 21, and next causes a mark corresponding to a region of the imaging target A2 to be displayed on the display screen 21. Also when the screen image data generation processing is executed in this manner, the generation system 1 similarly achieves the above-described effects.

The shape and the color of each mark is not limited to the white circle 50 or the black circle 51, and the position of each mark is not limited to a position in the vicinity of a corner of the imaging target. The mark may have any shape, color and position as long as a region of the imaging target can be specified.

Besides, the number of the imaging targets is not limited to twelve. Furthermore, the display panel 13 is not limited to a display panel containing liquid crystal sealed therein as long as it is a display panel in which an image is displayed on the display screen 21. The display panel 13 may be a display panel utilizing, for example, organic electroluminescence.

The present embodiment disclosed herein is to be considered in all respects as only illustrative and not restrictive. The scope of the invention is, therefore, indicated by the appended claims rather than by the foregoing description, and all changes which come within the meaning and range of equivalency of the claims are to be embraced within their scope.

REFERENCE SIGNS LIST

1 Generation system
10 Imaging device (imaging section)
11 Correction data generation device
13 Display panel
21 Display screen
44 Control section (display control section, screen image data generation section, specification section, extraction section, correction data generation section)
A1 to A4, B1 to B4, C1 to C4 Imaging targets
P Computer program

The invention claimed is:

1. A generation system, comprising:
a display control section configured to cause a mark image including a mark to be displayed on a display screen of a display panel, the mark having a prescribed shape and indicating a position of a boundary of a target region in an image;
an imaging section configured to capture a plurality of partial images each of which includes the mark and in each of which a part of the display screen is imaged with the mark image displayed on the display screen, and to generate captured image data of the plurality of partial images;
a specification section configured to specify, in each of the plurality of partial images, the target region within the partial image based on the mark included in the partial image;
an extraction section configured to extract, in each of the plurality of partial images, a target part corresponding to the target region from the captured image data of the partial image; and
a screen image data generation section configured to generate screen image data corresponding to captured image data of the whole display screen by synthesizing the target parts extracted by the extraction section.

2. The generation system according to claim 1,
wherein the target region has a rectangular shape, and
the display control section causes the mark image including the mark to be displayed, the mark being disposed outside the target region and in the vicinity of a corner of the target region.

3. The generation system according to claim 1,
wherein the display control section changes a position of the mark of the mark image displayed on the display screen every time the imaging section captures one or a plurality of the partial images.

4. The generation system according to claim 1,
wherein the display control section causes the mark image to be displayed on the display screen, the mark image including at least one mark set consisting of adjacently disposed two marks, an intermediate position between the two marks indicating the position of the boundary of the target region, and
the specification section specifies the target region within each of the partial images based on the mark set included in the partial image.

5. The generation system according to claim 1, comprising:
a correction data generation section configured to generate, based on the screen image data generated by the screen image data generation section, correction data to be used for correcting brightness unevenness occurring in the display screen.

6. The generation system according to claim 1,
wherein the mark image includes plural types of marks having different shapes or different colors.

7. The generation system according to claim 6,
wherein the types of marks include a first mark disposed around one end of the boundary of the target region and a second mark disposed around another end of the boundary of the target region.

8. The generation system according to claim 1,
wherein in the mark image, the target images are arranged in a matrix,
the partial images each include a corresponding one of the target images, and
the display control section changes a position of the mark in the mark image displayed on the displayed screen every time the imaging device captures one or a plurality of partial images included in the same row or the same column of the partial images.

9. The generation system according to claim 1,
wherein when the display control section causes the mark image to be displayed on the displayed screen, the target region has prescribed gradation values and the mark has a shape, color, or gradation value different from that of the target region.

10. A generation method, comprising:
causing a mark image including a mark to be displayed on a display screen of a display panel, the mark having a prescribed shape and indicating a position of a boundary of a target region in an image;
capturing a plurality of partial images each of which includes the mark and in each of which a part of the display screen is imaged with the mark image displayed on the display screen, and generating captured image data of the plurality of partial images;
specifying, in each of the plurality of partial images, the target region within the partial image based on the mark included in the partial image;
extracting, in each of the plurality of partial images, a target part corresponding to the target region from the captured image data of the partial image; and
generating screen image data corresponding to captured image data of the whole display screen by synthesizing the target parts extracted.

11. The generation method according to claim 10,
wherein in the causing a mark image, the target region has prescribed gradation values and the mark has a shape, color, or gradation value different from that of the target region.

12. A non-transitory computer readable storage medium recording thereon a computer program for execution by a computer, the computer program being configured to cause the computer to execute processing of:
causing a mark image including a mark to be displayed on a display screen of a display panel, the mark having a prescribed shape and indicating a position of a boundary of a target region in an image;
causing an imaging device to capture a plurality of partial images each of which includes the mark and in each of which a part of the display screen is imaged with the mark image displayed on the display screen to generate captured image data of the plurality of partial images, and acquiring the generated captured image data of the plurality of partial images;
specifying, in each of the plurality of partial images, the target region within the partial image based on the mark included in the partial image;
extracting, in each of the plurality of partial images, a target part corresponding to the target region from the captured image data of the partial image; and
generating screen image data corresponding to captured image data of the whole display screen by synthesizing the target parts extracted.

13. The non-transitory computer readable storage medium according to claim 12,
wherein the target region has a rectangular shape, and
the mark of the mark image is disposed outside the target region and in vicinity of a corner of the target region.

14. The non-transitory computer readable storage medium according to claim 12,
wherein the computer program causes the computer to execute processing of changing a position of the mark of the mark image displayed on the displayed screen every time the imaging device captures one or a plurality of partial images.

15. The non-transitory computer readable storage medium according to claim 14,
wherein in the mark image, target regions including the target region are arranged in a matrix,
the partial images each include a corresponding one of the target regions, and
the computer program causes the computer to execute processing of changing a position of the mark in the mark image displayed on the displayed screen every time the imaging device captures one or a plurality of partial images included in the same row or the same column of the partial images.

16. The non-transitory computer readable storage medium according to claim 12,
wherein the mark image includes at least one mark set consisting of adjacently disposed two marks,
an intermediate position between the two marks indicates the position of the boundary of the target region, and
the computer program causes the computer to execute processing of specifying the target region within each of the partial images based on the mark set included in the partial image.

17. The non-transitory computer readable storage medium according to claim 12,
wherein the computer program causes the computer to execute processing of generating, based on the screen image data, correction data to be used for correcting brightness unevenness occurring in the display screen.

18. The non-transitory computer readable storage medium according to claim 12,
wherein the mark image includes plural types of marks having different shapes or different colors.

19. The non-transitory computer readable storage medium according to claim 18,
wherein the types of marks include a first mark disposed around one end of the boundary of the target region and a second mark disposed around another end of the boundary of the target region.

20. The non-transitory computer readable storage medium according to claim 12,
wherein in the causing a mark image, the target region has prescribed gradation values and the mark has a shape, color, or gradation value different from that of the target region.

* * * * *